(12) United States Patent
Nader et al.

(10) Patent No.: US 11,671,939 B2
(45) Date of Patent: Jun. 6, 2023

(54) PAGING A WIRELESS DEVICE IN A GROUP OF WIRELESS DEVICES

(71) Applicant: Telefonaktiebolaget LM Ericsson (publ), Stockholm (SE)

(72) Inventors: Ali Nader, Malmö (SE); Per Fryking, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 141 days.

(21) Appl. No.: 17/254,287

(22) PCT Filed: Jul. 11, 2018

(86) PCT No.: PCT/EP2018/068773
§ 371 (c)(1),
(2) Date: Dec. 20, 2020

(87) PCT Pub. No.: WO2020/011345
PCT Pub. Date: Jan. 16, 2020

(65) Prior Publication Data
US 2021/0227498 A1    Jul. 22, 2021

(51) Int. Cl.
*H04W 68/02* (2009.01)
*H04W 68/00* (2009.01)
(52) U.S. Cl.
CPC ......... *H04W 68/02* (2013.01); *H04W 68/005* (2013.01)
(58) Field of Classification Search
CPC ..... H04W 68/02; H04W 68/005; Y02D 30/70
(Continued)

(56) References Cited

U.S. PATENT DOCUMENTS

| 2003/0119446 | A1* | 6/2003 | Fano | H04W 8/005 455/41.1 |
|---|---|---|---|---|
| 2011/0249571 | A1* | 10/2011 | Das | H04W 88/182 709/227 |

(Continued)

FOREIGN PATENT DOCUMENTS

| EP | 1578095 A1 | 9/2005 |
|---|---|---|
| EP | 2023680 A1 | 2/2009 |

OTHER PUBLICATIONS

PCT International Search Report, dated Apr. 5, 2019, in connection with International Application No. PCT/EP2018/068773, all pages.

(Continued)

*Primary Examiner* — Inder P Mehra
(74) *Attorney, Agent, or Firm* — Leffler Intellectual Property

(57) ABSTRACT

A method for handling paging from a network node is performed by a wireless device. The wireless device is part of a group of wireless devices communicating with each other over a short-range connection and communicating with a node over a long-range wireless connection at respective predefined occasions. The predefined occasions are defined by a power save mode configuration collectively determined for the group of wireless devices. The paging, when received during the predefined occasions for the wireless device, is received from the node. The method further comprises transmitting, when the paging is targeted for the wireless device itself, a paging response towards the node. The method further comprises forwarding, when the paging is targeted for another one of the wireless devices in the group of wireless devices, the paging to the targeted wireless device over the short-range connection.

29 Claims, 5 Drawing Sheets

(58) Field of Classification Search
USPC .......................................................... 455/458
See application file for complete search history.

(56) References Cited

U.S. PATENT DOCUMENTS

| | | |
|---|---|---|
| 2011/0256891 A1 | 10/2011 | Soliman et al. |
| 2015/0109981 A1* | 4/2015 | Patil .................. H04W 52/0212 370/336 |
| 2015/0358907 A1 | 12/2015 | Berggren et al. |
| 2016/0084936 A1* | 3/2016 | Smith .................... G01C 17/02 455/456.1 |
| 2017/0366236 A1* | 12/2017 | Ryoo ..................... H04B 7/043 |

OTHER PUBLICATIONS

PCT Written Opinion, dated Apr. 5, 2019, in connection with International Application No. PCT/EP2018/068773, all pages.

* cited by examiner

PAGING A WIRELESS DEVICE IN A GROUP OF WIRELESS DEVICES

TECHNICAL FIELD

Embodiments presented herein relate to a method, a wireless device, a computer program, and a computer program product for handling paging from a network node. Embodiments presented herein further relate to a method, a network node, a computer program, and a computer program product for paging the wireless device.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the capability for devices to connect and exchange data.

In general terms, the so-called Internet of Things (IoT) is a network of physical devices such as vehicles, home appliances, and other entities embedded with electronics, software, sensors, actuators, and connectivity which enables these physical devices to connect and exchange data.

IoT communication might comprise paging, signalling, exchange of data, measurement data, configuration information etc. To save power and network resources in a long-range network with IoT capable devices hosted by battery operated User Equipment (UE) having limited battery capacity, long Discontinuous Reception (DRX) cycles can be utilized.

With so-called enhanced DRX (eDRX) for example, a UE may be in a sleep mode up to about 3 hours in between paging occasions in which the network node may be able to page the UE. With the use of so-called power save mode (PSM), a UE might sleep up to about 1 year in between the occasions in which the network node is able to page the UE. This could enable the battery life of the UE to be extended to 10 years or more.

Since the UE will then check for paging rather seldom, the latency to page a UE is considerable. To transmit data to the network node in the network also requires power and network resources and is therefore made as seldom as possible. The resolution in time of the data collected from the UEs is therefore low.

Hence, there is still a need for an improved communication with wireless devices with long sleep times.

SUMMARY

An object of embodiments herein is to provide efficient communication with wireless devices with long sleep times that does not suffer from the issues noted above, or at least where these issues are reduced or mitigated.

According to a first aspect there is presented a method for handling paging from a network node. The method is performed by a wireless device. The wireless device is part of a group of wireless devices capable of communicating with each other over a short-range connection and capable of communicating with a network node over a long-range wireless connection at respective predefined occasions. The predefined occasions are defined by a power save mode configuration collectively determined for the group of wireless devices. The method comprises receiving paging originating from the network node. The paging, when received during the predefined occasions for the wireless device, is received from the network node. The method further comprises transmitting, when the paging is targeted for the wireless device itself, a paging response towards the network node. The method further comprises forwarding, when the paging is targeted for another one of the wireless devices in the group of wireless devices, the paging to the targeted wireless device over the short-range connection.

According to a second aspect there is presented a wireless device for handling paging from a network node. The wireless device is configured to be part of a group of wireless devices capable of communicating with each other over a short-range connection and capable of communicating with a network node over a long-range wireless connection at respective predefined occasions. The predefined occasions are defined by a power save mode configuration collectively determined for the group of wireless devices. The wireless device comprises processing circuitry. The processing circuitry is configured to cause the wireless device to receive paging originating from the network node. The paging, when received during the predefined occasions for the wireless device, is received from the network node. The processing circuitry is configured to cause the wireless device to transmit, when the paging is targeted for the wireless device itself, a paging response towards the network node. The processing circuitry is configured to cause the wireless device to forward, when the paging is targeted for another one of the wireless devices in the group of wireless devices, the paging to the targeted wireless device over the short-range connection.

According to a third aspect there is presented a wireless device for handling paging from a network node. The wireless device is configured to be part of a group of wireless devices capable of communicating with each other over a short-range connection and capable of communicating with a network node over a long-range wireless connection at respective predefined occasions. The predefined occasions are defined by a power save mode configuration collectively determined for the group of wireless devices. The wireless device comprises a receive module configured to receive paging originating from the network node. The paging, when received during the predefined occasions for the wireless device, is received from the network node. The wireless device comprises a transmit module configured to transmit, when the paging is targeted for the wireless device itself, a paging response towards the network node. The wireless device comprises a forward module configured to forward, when the paging is targeted for another one of the wireless devices in the group of wireless devices, the paging to the targeted wireless device over the short-range connection.

According to a fourth aspect there is presented a computer program for handling paging from a network node. The computer program comprises computer program code which, when run on processing circuitry of a wireless device, causes the wireless device to perform a method according to the first aspect.

According to a fifth aspect there is presented a method for paging a wireless device. The method is performed by a network node. The wireless device is part of a group of wireless devices capable of communicating with each other over a short-range connection and capable of communicating with the network node over a long-range wireless connection at respective predefined occasions. The predefined occasions are defined by a power save mode configuration collectively determined for the group of wireless devices. The method comprises transmitting a paging towards the wireless device. When the paging is transmitted during the predefined occasions for the wireless device, the paging is transmitted to the wireless device itself. When the paging is transmitted outside the predefined occasions for the wireless device, the paging is transmitted to another wireless device in the group of wireless devices and during the predefined occasions for this so-called another wireless device.

According to a sixth aspect there is presented a network node for paging a wireless device. The wireless device is part of a group of wireless devices capable of communicating with each other over a short-range connection and capable of communicating with the network node over a long-range wireless connection at respective predefined occasions. The predefined occasions are defined by a power save mode configuration collectively determined for the group of wireless devices. The network node comprises processing circuitry. The processing circuitry is configured to cause the network node to transmit a paging towards the wireless device. When the paging is transmitted during the predefined occasions for the wireless device, the paging is transmitted to the wireless device itself. When the paging is transmitted outside the predefined occasions for the wireless device, the paging is transmitted to another wireless device in the group of wireless devices and during the predefined occasions for this so-called another wireless device.

According to a seventh aspect there is presented a network node for paging a wireless device. The wireless device is part of a group of wireless devices capable of communicating with each other over a short-range connection and capable of communicating with the network node over a long-range wireless connection at respective predefined occasions. The predefined occasions are defined by a power save mode configuration collectively determined for the group of wireless devices. The network node comprises a transmit module configured to transmit a paging towards the wireless device. When the paging is transmitted during the predefined occasions for the wireless device, the paging is transmitted to the wireless device itself. When the paging is transmitted outside the predefined occasions for the wireless device, the paging is transmitted to another wireless device in the group of wireless devices and during the predefined occasions for this so-called another wireless device.

According to an eight aspect there is presented a computer program for paging a wireless device, the computer program comprising computer program code which, when run on processing circuitry of a network node, causes the network node to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these wireless devices, these network nodes, and these computer programs provide efficient paging of wireless devices with long sleep times.

Advantageously these methods, these wireless devices, these network nodes, and these computer programs enable efficient communication with the wireless device without suffering from the issues noted above.

Advantageously these methods, these wireless devices, these network nodes, and these computer programs enable wireless devices to be paged with rather short delay without compromising too much on the power consumption of the wireless devices.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
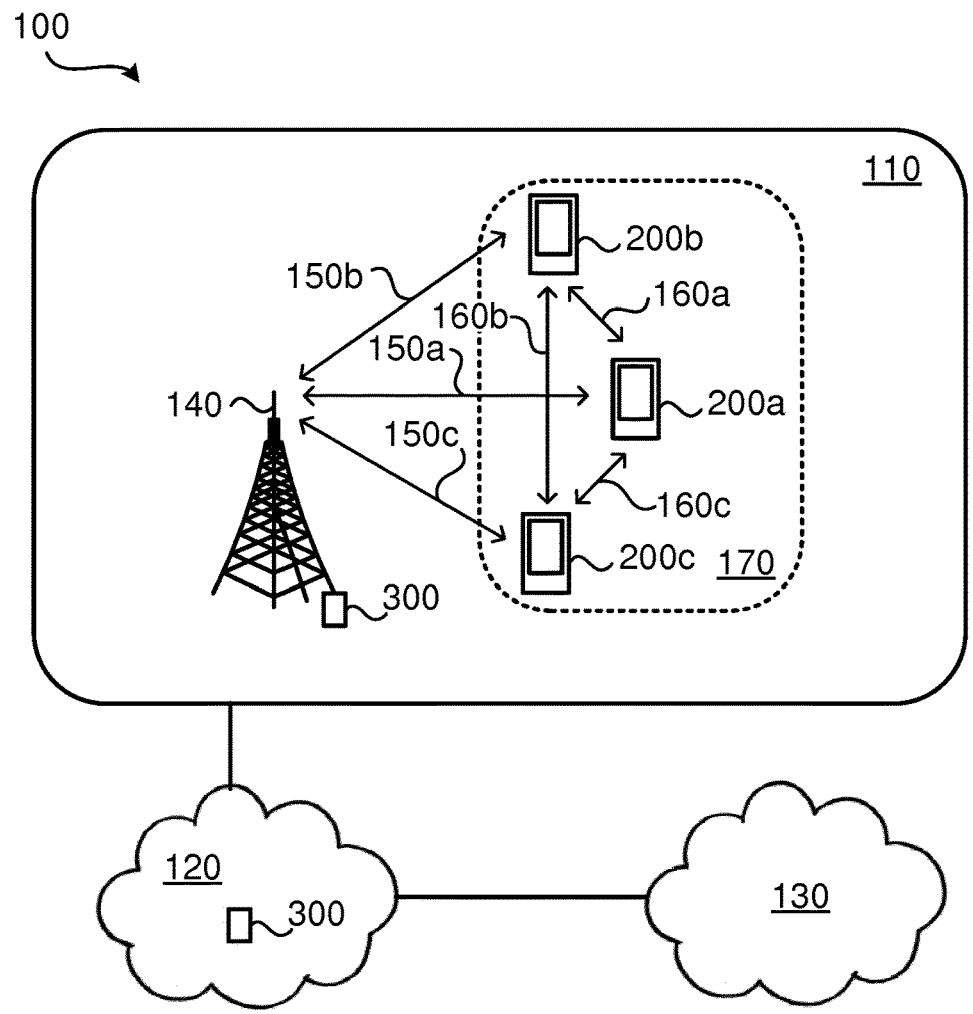
FIG. 1 is a schematic diagram illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, or a fifth (5G) telecommunications network and support any 3GPP telecommunications standard, where applicable.

The communication network 100 comprises a network node 300 configured to, via a radio access network node 140, provide network access to wireless devices 200a, 200b, 200c in a radio access network 110. The radio access network 110 is operatively connected to a core network 120. The core network 120 is in turn operatively connected to a service network 130, such as the Internet. The wireless devices 200a, 200b, 200c are thereby enabled to access services of, and exchange data with, the service network 130.

Examples of network nodes 300 are radio access network nodes, radio base stations, base transceiver stations, Node Bs, evolved Node Bs, g Node Bs, access points, and access nodes, and backhaul nodes. Examples of wireless devices 200a, 200b, 200c are mobile stations, mobile phones, handsets, wireless local loop phones, user equipment (UE), smartphones, laptop computers, tablet computers, network equipped sensors, network equipped vehicles, and so-called IoT devices. In this respect, the functionality of network equipped sensors, network equipped vehicles, and so-called IoT devices could be hosted by the wireless devices 200a, 200b, 200c.

The wireless devices 200a, 200b, 200c form a group of wireless devices. In some aspects the group of wireless devices 200a, 200b, 200c defines a mesh network 170. The wireless devices 200a, 200b, 200c in the group of wireless devices 200a, 200b, 200c are capable of communicating with each other over a short-range connection 160a, 160b, 160c. There could be different types of short-range connections 160a, 160b, 160c. The short-range connection 160a, 160b, 160c is wireless or wired. Examples of short-range connections 160a, 160b, 160c include but are not limited to Bluetooth (BLE) and Zigbee.

The wireless devices 200a, 200b, 200c in the group of wireless devices 200a, 200b, 200c are further capable of communicating with the network node 300 over a long-range wireless connection 150a, 150b, 150c. There could be different types of long-range wireless connection 150a, 150b, 150c. Examples of long-range wireless connections 150a, 150b, 150c include but are not limited to wireless connections established over a 3G air interface, a 4G air interface, or a 5G air interface, optionally using additional technologies such as Cat-M, NB-IoT, SigFox and Lora.

The wireless devices 200a, 200b, 200c in the group of wireless devices 200a, 200b, 200c are further capable of communicating with the network node 300 over a long-range wireless connection 150a, 150b, 150c at respective predefined occasions. The predefined occasions are defined by a PSM configuration. In general terms, the PSM configuration specifies how often each wireless device 200a, 200b, 200c is to exit the sleep mode for being reachable and for how long each wireless device 200a, 200b, 200c is to stay awake during each reachable occasion (i.e., when and how long Active Time each wireless device 200a, 200b, 200c is configured with). The tracking area update (TAU) timer T3412 can be used for this purpose in case the wireless device 200a, 200b, 200c needs to report its presence via a tracking area update procedure, including both transmission and reception activity of the wireless device 200a, 200b, 200c.

Each wireless device 200a, 200b, 200c is thus configured with a PSM configuration. In general terms, if the PSM configuration is individually adopted for each wireless device 200a, 200b, 200c, this might cause an individual wireless device 200a to have sleep time (i.e. to be in sleep mode) for 1 year or more. As disclosed above there is therefore a need for an improved communication with wireless devices with long sleep times.

As an example, assume that a PSM configuration is individually adopted for one wireless device 200a. Assume further that the battery power of this wireless device 200a is enough for $N_{lifespan}$ (say, 3650) TAU-related activities. Excluding any other activities in this example, the life expectancy for this wireless device 200a would be about 10 years if it is reachable only once per day.

Assume further that there exist $N_{Devices}$ (say 100) of these wireless device 200a, 200b, 200c in the group of wireless devices 200a, 200b, 200c, and that it is desirable by an operator to, within, say 6 minutes, be able to check the status of any wireless device 200a, 200b, 200c in the group of wireless devices 200a, 200b, 200c, and that it is possible to invoke the functionality of the IoT device hosted by any of these wireless devices 200a, 200b, 200c in the group of wireless devices 200a, 200b, 200c based on certain triggers. To be able to conform to these requirements, each individual wireless device 200a, 200b, 200c would have a life expectancy of about 2 weeks (i.e. each wireless device 200a, 200b, 200c is reachable 240 times per day).

In further detail, one issue is that for many applications as run on the wireless device 200a, 200b, 200c it is necessary to reach the wireless device 200a, 200b, 200c from the network node 300 with rather short delay. For example, it might be necessary to order an IoT device implementing an alarm functionality and operatively connected to the network 100 via a wireless device 200a hosting the IoT device to, within seconds, turn on an alarm signal. Such reachability comes at a high cost of power consumption for the hosting wireless device 200a. If the alarm, in this illustrative example, is configured to be reachable with short notice, the full extent of the aforementioned tools (eDRX and PSM with long sleep intervals) cannot be used, and hence resulting in that the battery life of the hosting wireless device 200a will be reduced.

If on the other hand these wireless devices 200a, 200b, 200c would operate in a collaborative and coordinated manner, these wireless devices 200a, 200b, 200c could take turn in waking up to check, over the long-range wireless connection 150a, 150b, 150c, whether there is a message for any wireless device 200a, 200b, 200c in the group of wireless devices 200a, 200b, 200c from the network node 300.

According to the herein disclosed embodiments the PSM configuration is therefore collectively determined for the group of wireless devices 200a, 200b, 200c. In this respect, according to the PSM configuration the predefined occasions a distributed within the group of wireless devices 200a, 200b, 200c such that all the predefined occasions, for all the wireless devices 200a, 200b, 200c in the group of wireless devices 200a, 200b, 200c, do not fully overlap in time. In other words, the PSM configuration is collectively determined for the group of wireless devices 200a, 200b, 200c such that the wireless devices 200a, 200b, 200c take turn in waking up from sleep mode according to the distribution of the predefined occasions among the wireless devices 200a, 200b, 200c over a sleep cycle (i.e. from one predefined occasion when a particular one of the wireless devices 200a, 200b, 200c wakes up to the next predefined occasion when the particular one of the wireless devices 200a, 200b, 200c wakes up the next time.

The predefined occasions might be distributed uniformly in time among the wireless devices 200a, 200b, 200c, for example within one sleep cycle of the PSM configuration. In other aspects the predefined occasions are determined according to characteristics, such as remaining battery power, total battery capacity, and coverage using the short-range connection 160a, 160b, 160c, and/or the long-range wireless connection 150a, 150b, 150c, of the wireless devices 200a, 200b, 200c in the group of wireless devices 200a, 200b, 200c. Thereby, a wireless device with a comparably high level of remaining battery power might have more, or longer, predefined occasions than another wireless device with a comparably low level of remaining battery power, and so on.

This would result in about $N_{Devices}$ longer life expectancy per wireless device 200a, 200b, 200c whilst still fulfilling the reachability requirements. It is noted that for the sake of this illustrative example, the power consumption for communication between the wireless devices 200a, 200b, 200c over the short-range connections 160a, 160b, 160c is disregarded here. However, communication over the short-range connections 160a, 160b, 160c is assumed to consume less, or even substantially less, such as one order of magnitude or more, battery power than communication over the long-range wireless connections 150a, 150b, 150c.

The embodiments disclosed herein relate to mechanisms for handling paging from a network node 300 and paging a wireless device 200a. In order to obtain such mechanisms there is provided a wireless device 200a, a method performed by the wireless device 200a, a computer program product comprising code, for example in the form of a computer program, that when run on processing circuitry of the wireless device 200a, causes the wireless device 200a to perform the method. In order to obtain such mechanisms there is further provided a network node 300, a method performed by the network node 300, and a computer program product comprising code, for example in the form of a computer program, that when run on processing circuitry of the network node 300, causes the network node 300 to perform the method.

Figure 2:
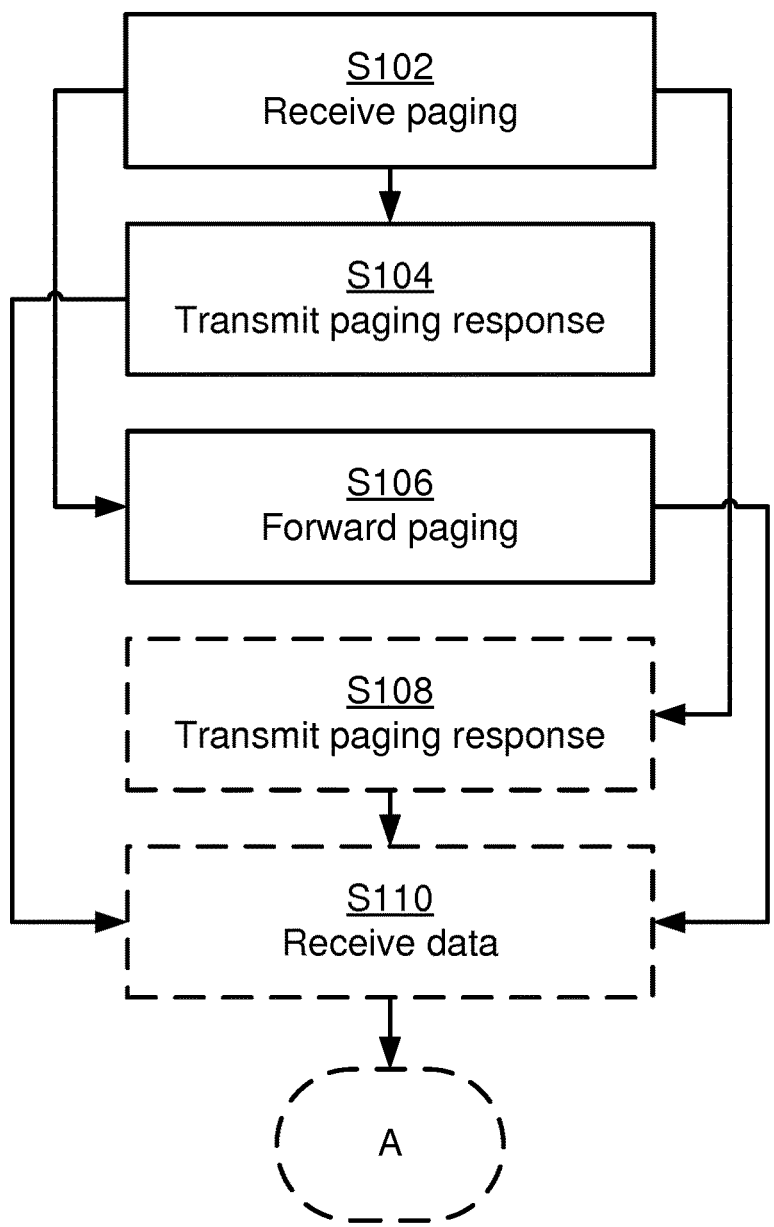
FIGS. 2 and 3 are flowcharts of methods according to embodiments.
Figure 2:
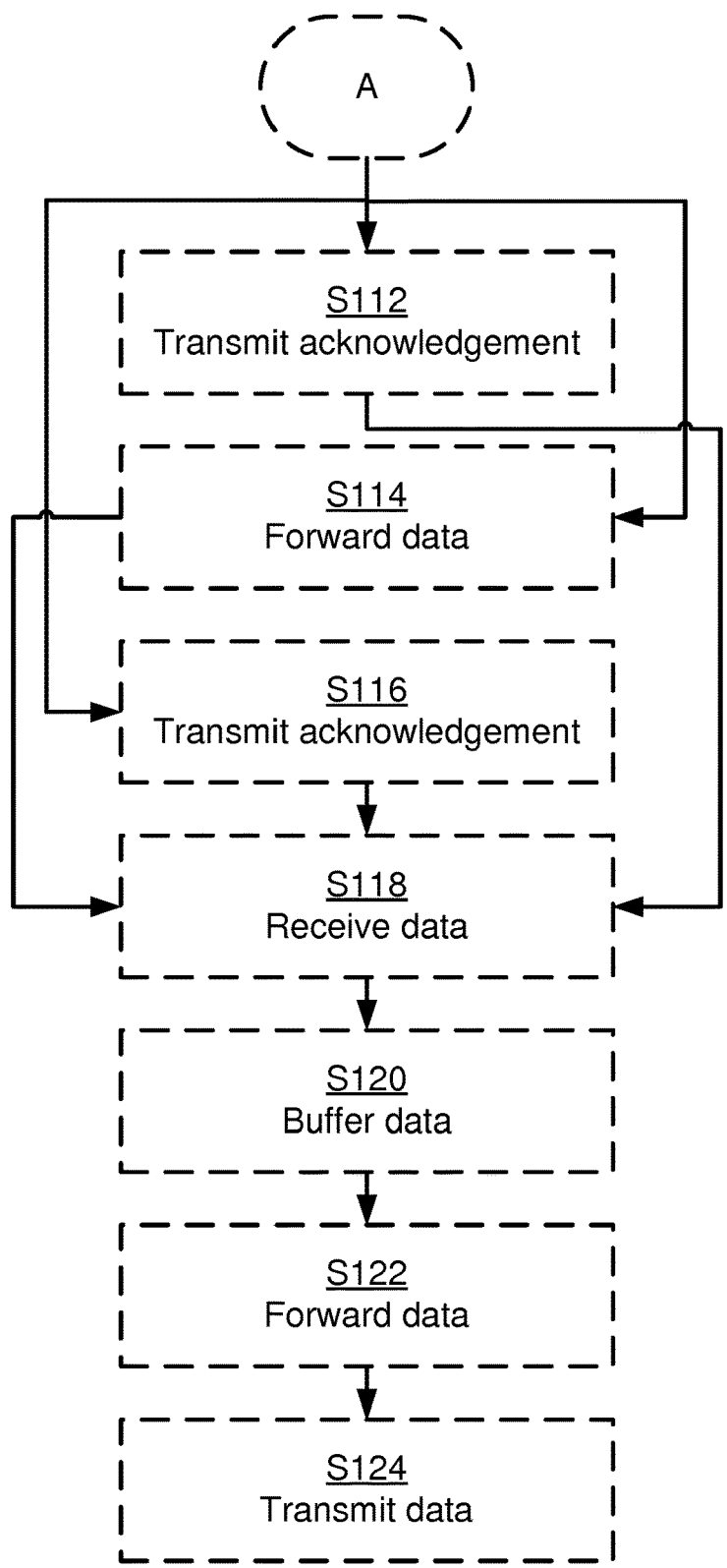

Reference is now made to FIG. 2 illustrating a method for handling paging from a network node 300 as performed by the wireless device 200a according to an embodiment.

It is assumed that a paging for one of the wireless devices 200a, 200b, 200c is transmitted by the network node 300 and that this paging is received by the wireless device 200a. Hence, the wireless device 200a is configured to perform step S102:

S102: The wireless device 200a receives paging originating from the network node. The paging, when received during the predefined occasions for the wireless device 200a, is received from the network node 300.

Either step S104 or step S106 is then entered, depending on which wireless device in the group of wireless devices 200a, 200b, 200c the paging is targeting.

Particularly, the wireless device 200a is configured to perform step S104 when the paging is targeted for the wireless device 200a itself.

S104: The wireless device 200a transmits, when the paging is targeted for the wireless device 200a itself, a paging response towards the network node 300.

The wireless device 200a is configured to perform step S106 when the paging is not targeted for the wireless device 200a itself.

S106: The wireless device 200a forwards, when the paging is targeted for another one of the wireless devices 200b, 200c in the group of wireless devices 200a, 200b, 200c, the paging to the targeted wireless device 200b, 200c over the short-range connection 160a, 160b, 160c.

The wireless devices 200a, 200b, 200c within the group of wireless devices 200a, 200b, 200c thereby collaborate such that the reachability of the wireless devices 200a, 200b, 200c from the network node 300 increases at the same time as the power consumption of the wireless devices 200a, 200b, 200c is kept low.

Embodiments relating to further details of handling paging from a network node 300 as performed by the wireless device 200a will now be disclosed.

In some aspects when the paging is received during one of the predefined occasions for the wireless device 200a, the wireless device 200a according to its PSM configuration wakes up, establishes an operational connection to the network node 300, and wireless device 200a performs a TAU procedure with the network node 300. The wireless device 200a might then receive the paging as in step S102 only upon having entered radio resource control (RRC) connected mode. However, alternatively the paging is received outside the predefined occasions for the wireless device 200a which thus not requires the wireless device 200a to be in RRC connected mode.

There may be different ways for the wireless device 200a to act when the paging is received outside the predefined occasions for the wireless device 200a. In some aspects the paging is received outside the predefined occasions for the wireless device 200a and targeted for the wireless device 200a itself. The paging is then received from another wireless device 200b in the group of wireless devices 200a, 200b, 200c. According to an embodiment the wireless device 200a is then configured to perform (optional) step S108:

S108: The wireless device 200a transmits a paging response towards the network node 300.

There could be different ways for the wireless device 200a to transmit the paging response. In some aspects the paging response is transmitted to the network node 300 over the long-range wireless connection 150a, 150b, 150c. In other aspects the paging response is transmitted to the so-called another wireless device 200b over the short-range connection 160a, 160b, 160c. The paging response might be transmitted either outside the predefined occasions for the wireless device 200a or during one of the predefined occasions for the wireless device 200a. How and when to transmit the paging response might depend on the network coverage and/or current battery level of the wireless device 200a. For example, if another wireless device 200b has better network coverage and/or more remaining battery life, the paging response might be transmitted to the so-called another wireless device 200b for forwarding therefrom to the network node 300.

In some aspects the wireless device 200a receives data originating from the network node 300. Particularly, according to an embodiment the wireless device 200a is configured to perform (optional) step S110:

S110: The wireless device 200a receives data originating from the network node 300.

There could be different ways for the wireless device 200a to receive the data originating from the network node 300.

In some aspects the data is received during one of the predefined occasions for the wireless device 200a. Particularly, according to an embodiment the data, when received during the predefined occasions for the wireless device 200a, is received from the network node 300 over the long-range wireless connection 150a, 150b, 150c. The wireless device 200a might then be configured to perform either (optional) step S112 or (optional) step S114, depending on whether the data is targeted for the wireless device 200a itself or not:

S5112: The wireless device 200a transmits, when the data is targeted for the wireless device 200a itself, an acknowledgement towards the network node 300 over the long-range wireless connection 150a, 150b, 150c.

S114: The wireless device 200a forwards, when the data is targeted for another one of the wireless devices 200b, 200c in the group of wireless devices 200a, 200b, 200c, the data to the targeted wireless device 200b, 200c over the short-range connection 160a, 160b, 160c.

In some aspects the data is received outside the predefined occasions for the wireless device 200a. Particularly, according to an embodiment the data is targeted for the wireless device 200a itself and, when received outside the predefined occasions for the wireless device 200a, is received from another wireless device 200b in the group of wireless devices 200a, 200b, 200c over the short-range connection 160a, 160b, 160c. According to an embodiment the wireless device 200a is then configured to perform (optional) step S116:

S116: The wireless device 200a transmits an acknowledgement towards the network node 300.

The acknowledgement might be transmitted to the network node 300 over the long-range wireless connection 150a, 150b, 150c. The acknowledgement might be transmitted either outside the predefined occasions for the wireless device 200a or during one of the predefined occasions for the wireless device 200a. How and when to transmit the acknowledgement might depend on the network coverage and/or current battery level of the wireless device 200a. For example, if another wireless device 200b has better network coverage and/or more remaining battery life, the acknowledgement might be transmitted to the so-called another wireless device 200b for forwarding therefrom to the network node 300.

In some aspects the wireless device 200a receives data from another wireless device 200b and then forwards this data to the network node 300.

Particularly, according to an embodiment the wireless device 200a is configured to perform (optional) step S118 and (optional) step S122:

S118: The wireless device 200a receives data from another wireless device 200b in the group of wireless devices 200a, 200b, 200c. The data targets the network node 300.

S122: The wireless device 200a forwards the data to the network node 300 during one of the predefined occasions for the wireless device 200a over the long-range wireless connection 150a, 150b, 150c.

In some aspects the data received in step S118 is buffered at the wireless device 200a before being forwarded in step S122. Particularly, according to an embodiment the wireless device 200a is configured to perform (optional) step S120 when the data is received outside the predefined occasions for the wireless device 200a:

S120: The wireless device 200a buffers the data (as received in step S118) until a next-most occurring predefined occasion for the wireless device 200a.

Step S120, when performed, is thus performed between step S118 and step S122.

In some aspects the data (as received in step S118) is buffered together with data received from yet another wireless device 200c in the group of wireless devices 200a, 200b, 200c and targeting the network node 300. The data to received from this yet another wireless device 200c is then forwarded to the network node 300 together with the data received from the so-called another wireless device 200b in step S122.

In some aspects the wireless device 200a transmits own data towards the network node 300. Particularly, according to an embodiment the wireless device 200a is configured to perform (optional) step S124:

S124: The wireless device 200a transmits data towards the network node 300.

There could be different ways for the wireless device 200a to transmit the data towards the network node 300.

In some aspects the data is transmitted to the network node 300 over the long-range wireless connection 150a, 150b, 150c when transmitted during one of the predefined occasions for the wireless device 200a.

In some aspects the data is transmitted to another wireless devices 200b, 200c in the group of wireless devices 200a, 200b, 200c over the short-range connection 160a, 160b, 160c when transmitted outside one of the predefined occasions for the wireless device 200a. In the latter case the data might be transmitted to that wireless device 200b having the next-most occurring predefined occasion. That is, the so-called another wireless device 200b might have the next-most occurring predefined occasion.

Figure 3:
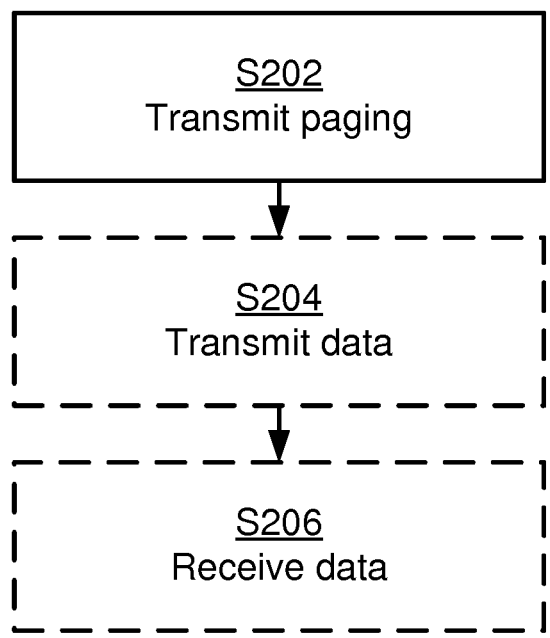

Reference is now made to FIG. 3 illustrating a method for paging a wireless device 200a as performed by the network node 300 according to an embodiment.

It is assumed that the network node 300 needs to page the wireless device 200a. Hence, the network node 300 is configured to perform step S202:

S202: The network node 300 transmits a paging towards the wireless device 200a.

There are different ways for the network node 300 to transmit the paging depending on whether the paging is transmitted during one of the predefined occasions or outside the predefined occasions for the wireless device 200a.

When the paging is transmitted during the predefined occasions for the wireless device 200a, the paging is transmitted to the wireless device 200a itself.

When the paging is transmitted outside the predefined occasions for the wireless device 200a, the paging is transmitted to another wireless device 200b in the group of wireless devices 200a, 200b, 200c and during the predefined occasions for the so-called another wireless device 200b.

Thus, when there is a need to page a wireless device 200a being part of a group of wireless devices 200a, 200b, 200c, the network node 300 might page the wireless device with predefined occasion nearest in time according to the PSM configuration and inform this wireless device that the paging is relevant for a target wireless device.

Embodiments relating to further details of paging a wireless device 200a as performed by the network node 300 will now be disclosed.

In some aspects the network node 300 transmits data towards the wireless device 200a. Particularly, according to an embodiment the network node 300 is configured to perform (optional) step S204:

S204: The network node 300 transmits data towards the wireless device 200a.

There are different ways for the network node 300 to transmit the data towards the wireless device 200a in step S204 depending on whether the data is transmitted during one of the predefined occasions or outside the predefined occasions for the wireless device 200a.

Particularly, when the data is transmitted during the predefined occasions for the wireless device 200a, the data is transmitted to the wireless device 200a itself. When the data is transmitted outside the predefined occasions for the wireless device 200a, the data is transmitted to another wireless device 200b in the group of wireless devices 200a, 200b, 200c and during the predefined occasions for the so-called another wireless device 200b.

In some aspects the network node 300 receives data from the wireless device 200a. Particularly, according to an embodiment the network node 300 is configured to perform (optional) step S206:

S206: The network node 300 receives data from the wireless device 200a.

There could be different ways for the network node 300 to receive the data from the wireless device 200a. For example, the data might in step S206 be received from the wireless device 200a itself, or from another wireless device 200b in the group of wireless devices 200a, 200b, 200c.

The data might be received either outside the predefined occasions for the wireless device 200a or during one of the predefined occasions for the wireless device 200a.

As disclosed above, the wireless device 200a might transmit its own data together with data from yet another wireless device 200c. The same applies for the so-called another wireless device 200b. Hence, in some aspects the data is received together with data from yet another wireless device 200c in the group of wireless devices 200a, 200b, 200c.

Figure 4:
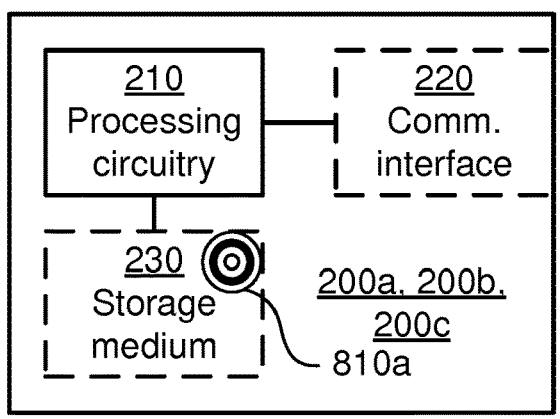
FIG. 4 is a schematic diagram showing functional units of a wireless device according to an embodiment.

FIG. 4 schematically illustrates, in terms of a number of functional units, the components of a wireless device 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810a (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless device 200a to perform a set of operations, or steps, as disclosed above. For example, the storage medium 230 may store the set of operations, and the processing circuitry 210 may be configured to retrieve the set of operations from the storage medium 230 to cause the wireless device 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The wireless device 200a may further comprise a communications interface 220 for communications with other entities, nodes, functions, and devices. As such the communications interface 220 may comprise one or more transmitters and receivers, comprising analogue and digital components. The communications interface 220 may be configured for communication with the network node 300 over the long-range wireless connection 150a, 150b, 150c and with other wireless devices 200b, 200c over the short-range connection 160a, 160b, 160c.

The processing circuitry 210 controls the general operation of the wireless device 200a e.g. by sending data and control signals to the communications interface 220 and the storage medium 230, by receiving data and reports from the communications interface 220, and by retrieving data and instructions from the storage medium 230. Other components, as well as the related functionality, of the wireless device 200a are omitted in order not to obscure the concepts presented herein.

Figure 5:
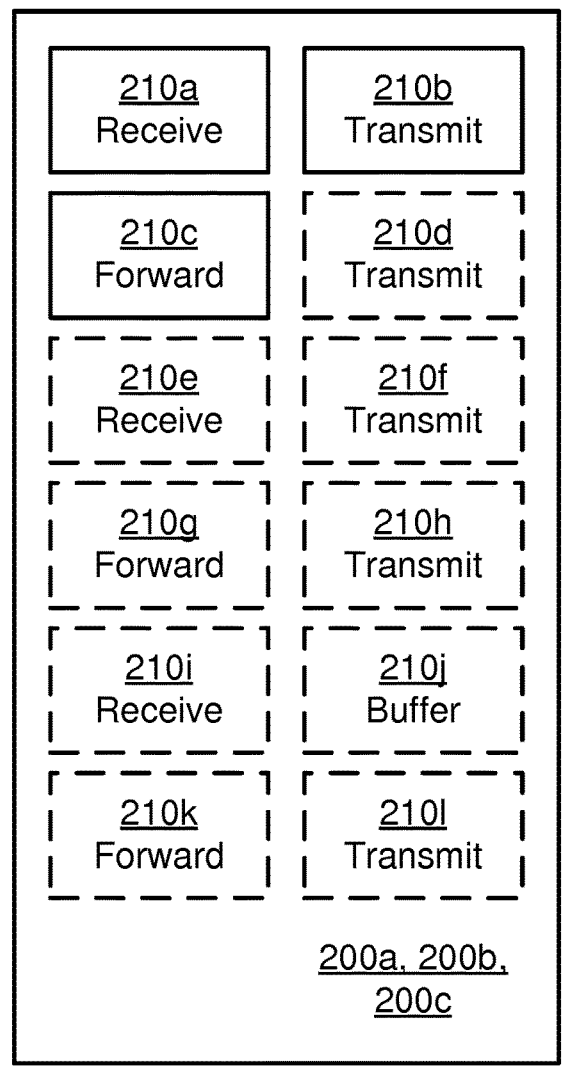
FIG. 5 is a schematic diagram showing functional modules of a wireless device according to an embodiment.

FIG. 5 schematically illustrates, in terms of a number of functional modules, the components of a wireless device 200a according to an embodiment. The wireless device 200a of FIG. 5 comprises a number of functional modules; a receive module 210a configured to perform step S102, a transmit module 210b configured to perform step S104, and a forward module 210c configured to perform step S106. The wireless device 200a of FIG. 5 may further comprise a number of optional functional modules, such as any of a transmit module 21od configured to perform step S108, a receive module 210e configured to perform step S110, a transmit module 210f configured to perform step S112, a forward module 210g configured to perform step S114, a transmit module 210h configured to perform step S116, a receive module 210e configured to perform step S118, a buffer module 210j configured to perform step S120, a forward module 210k configured to perform step S122, a Xtransmit module 210l configured to perform step S124.

In general terms, each functional module 210a-210l may be implemented in hardware or in software. Preferably, one or more or all functional modules 210a-210l may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210l and to execute these instructions, thereby performing any steps of the wireless device 200a as disclosed herein.

Examples of wireless devices 200a have been disclosed above. For example, as noted above the wireless device 200a might host the functionality of an IoT device.

Figure 6:
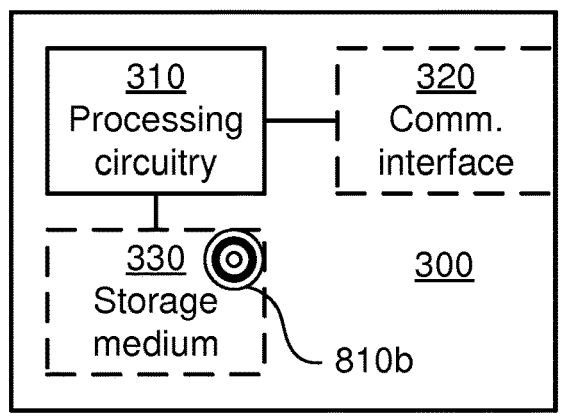
FIG. 6 is a schematic diagram showing functional units of a network node according to an embodiment.

FIG. 6 schematically illustrates, in terms of a number of functional units, the components of a network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 810b (as in FIG. 8), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 300 to perform a set of operations, or steps, as disclosed above. For example, the storage medium 330 may store the set of operations, and the processing circuitry 310 may be configured to retrieve the set of operations from the storage medium 330 to cause the network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 300 may further comprise a communications interface 320 for communications with other entities, nodes, functions, and devices. As such the communications interface 320 may comprise one or more transmitters and receivers, comprising analogue and digital components. The communications interface 320 may be configured for communication with the wireless devices 200a, 200b, 200c, via the radio access network node 140, over the long-range wireless connection 150a, 150b, 150c and with the core network 120 and/or service network 130 via another connection.

The processing circuitry 310 controls the general operation of the network node 300 e.g. by sending data and control signals to the communications interface 320 and the storage medium 330, by receiving data and reports from the communications interface 320, and by retrieving data and instructions from the storage medium 330. Other components, as well as the related functionality, of the network node 300 are omitted in order not to obscure the concepts presented herein.

Figure 7:
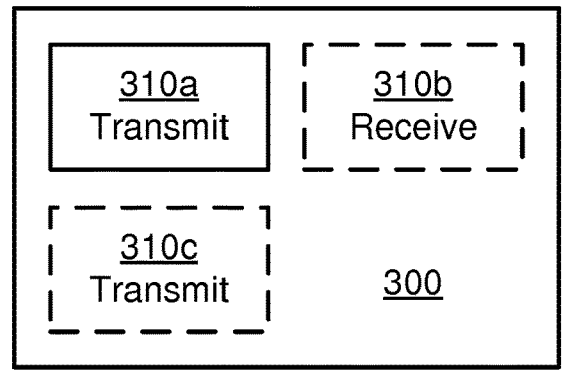
FIG. 7 is a schematic diagram showing functional modules of a network node according to an embodiment.

FIG. 7 schematically illustrates, in terms of a number of functional modules, the components of a network node 300 according to an embodiment. The network node 300 of FIG. 7 comprises a transmit module 310a configured to perform step S202. The network node 300 of FIG. 7 may further comprise a number of optional functional modules, such as any of a receive module 310b configured to perform step S204, and a transmit module 310c configured to perform step S206. In general terms, each functional module 310a-310c may be implemented in hardware or in software. Preferably, one or more or all functional modules 310a-310c may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310c and to execute these instructions, thereby performing any steps of the network node 300 as disclosed herein.

Examples of network nodes 300 have been disclosed above. Further, the network node 300 may be provided as a standalone device or as a part of at least one further device. For example, the network node 300 may be provided in a node of the radio access network 110 or in a node of the core network 120. Alternatively, functionality of the network node 300 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 300 may be executed in a first device, and a second portion of the of the instructions performed by the network node 300 may be executed in a second device; the herein disclosed embodiments are not limited to any particular number of devices on which the instructions performed by the network node 300 may be executed. Hence, the methods according to the herein disclosed embodiments are suitable to be performed by a network node 300 residing in a cloud computational environment. Therefore, although a single processing circuitry 310 is illustrated in FIG. 6 the processing circuitry 310 may be distributed among a plurality of devices, or nodes. The same applies to the functional modules 310a-310c of FIG. 7 and the computer program 820b of FIG. 8.

Figure 8:
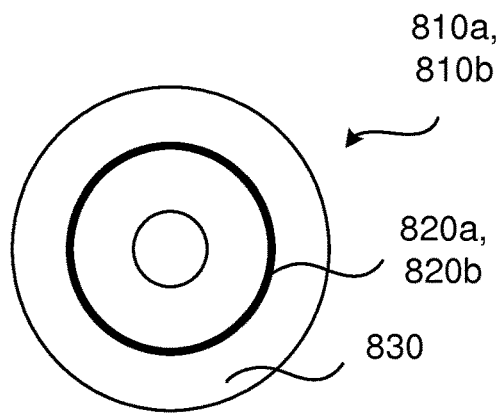
FIG. 8 shows one example of a computer program product comprising computer readable means according to an embodiment.

FIG. 8 shows one example of a computer program product 810a, 810b comprising computer readable means 830. On this computer readable means 830, a computer program 820a can be stored, which computer program 820a can cause the processing circuitry 210 and thereto operatively coupled entities and devices, such as the communications interface 220 and the storage medium 230, to execute methods according to embodiments described herein. The computer program 820a and/or computer program product 810a may thus provide means for performing any steps of the wireless device 200a as herein disclosed. On this computer readable means 830, a computer program 820b can be stored, which computer program 820b can cause the processing circuitry 310 and thereto operatively coupled entities and devices, such as the communications interface 320 and the storage medium 330, to execute methods according to embodiments described herein. The computer program 820b and/or computer program product 810b may thus provide means for performing any steps of the network node 300 as herein disclosed.

In the example of FIG. 8, the computer program product 810a, 810b is illustrated as an optical disc, such as a CD (compact disc) or a DVD (digital versatile disc) or a Blu-Ray disc. The computer program product 810a, 810b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820a, 820b is here schematically shown as a track on the depicted optical disk, the computer program 820a, 820b can be stored in any way which is suitable for the computer program product 810a, 810b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling paging from a network node, the method being performed by a wireless device, wherein the wireless device is part of a group of wireless devices capable of communicating with each other over a short-range connection and capable of communicating with a network node over a long-range wireless connection at respective predefined occasions, the predefined occasions being defined by a power save mode (PSM) configuration collectively determined for the group of wireless devices, the method comprising:
receiving paging originating from the network node, wherein the paging when received during the predefined occasions for the wireless device is received from the network node, the method further comprises:
transmitting, when the paging is targeted for the wireless device itself, a paging response towards the network node; and
forwarding, when the paging is targeted for another one of the wireless devices in the group of wireless devices, the paging to the targeted wireless device over the short-range connection.

2. The method according to claim 1, wherein, when the paging is received outside the predefined occasions for the wireless device and targeted for the wireless device itself, is received from another wireless device in the group of wireless devices, the method further comprises:
transmitting a paging response towards the network node.

3. The method according to claim 2, wherein the paging response is transmitted to the network node over the long-range wireless connection.

4. The method according to claim 2, wherein the paging response is transmitted to said another wireless device over the short-range connection.

5. The method according to claim 1, further comprising:
receiving data originating from the network node.

6. The method according to claim 5, wherein the data when received during the predefined occasions for the wireless device is received from the network node over the long-range wireless connection, the method further comprises:
  transmitting, when the data is targeted for the wireless device itself, an acknowledgement towards the network node over the long-range wireless connection; and
  forwarding, when the data is targeted for another one of the wireless devices in the group of wireless devices, the data to the targeted wireless device over the short-range connection.

7. The method according to claim 5, wherein the data is targeted for the wireless device itself and, when received outside the predefined occasions for the wireless device, is received from another wireless device in the group of wireless devices over the short-range connection, the method further comprises:
  transmitting an acknowledgement towards the network node.

8. The method according to claim 7, wherein the acknowledgement is transmitted to the network node over the long-range wireless connection.

9. The method according to claim 1, further comprising:
  receiving data from another wireless device in the group of wireless devices, the data targeting the network node; and
  forwarding the data to the network node during one of the predefined occasions for the wireless device over the long-range wireless connection.

10. The method according to claim 9, wherein when the data is received outside the predefined occasions for the wireless device, the method further comprising:
  buffering the data until a next-most occurring predefined occasion for the wireless device.

11. The method according to claim 10, wherein the data is buffered together with data received from yet another wireless device in the group of wireless devices and targeting the network node, and wherein the data received from said yet another wireless device is forwarded to the network node together with the data received from said another wireless device.

12. The method according to claim 1, further comprising:
  transmitting data towards the network node.

13. The method according to claim 12, wherein the data is transmitted to the network node over the long-range wireless connection when transmitted during one of the predefined occasions for the wireless device.

14. The method according to claim 12, wherein the data is transmitted to another wireless devices in the group of wireless devices over the short-range connection when transmitted outside one of the predefined occasions for the wireless device.

15. The method according to claim 14, wherein said another wireless device has a next-most occurring predefined occasion.

16. A method for paging a wireless device, the method being performed by a network node, the wireless device being part of a group of wireless devices capable of communicating with each other over a short-range connection and capable of communicating with the network node over a long-range wireless connection at respective predefined occasions, the predefined occasions being defined by a power save mode (PSM) configuration collectively determined for the group of wireless devices, the method comprising:
  transmitting a paging towards the wireless device,
  wherein, when the paging is transmitted during the predefined occasions for the wireless device, the paging is transmitted to the wireless device itself, and
  wherein, when the paging is transmitted outside the predefined occasions for the wireless device, the paging is transmitted to another wireless device in the group of wireless devices and during the predefined occasions for said another wireless device.

17. The method according to claim 16, further comprising:
  transmitting data towards the wireless device,
  wherein, when the data is transmitted during the predefined occasions for the wireless device, the data is transmitted to the wireless device itself, and
  wherein, when the data is transmitted outside the predefined occasions for the wireless device, the data is transmitted to another wireless device in the group of wireless devices and during the predefined occasions for said another wireless device.

18. The method according to claim 16, further comprising:
  receiving data from the wireless device,
  wherein, the data is received from the wireless device itself, or from another wireless device in the group of wireless devices.

19. The method according to claim 18, wherein the data is received together with data from yet another wireless device in the group of wireless devices.

20. The method according to claim 16, wherein the group of wireless devices defines a mesh network.

21. The method according to claim 16, wherein the short-range connection is wireless or wired.

22. A wireless device for handling paging from a network node, the wireless device being configured to be part of a group of wireless devices capable of communicating with each other over a short-range connection and capable of communicating with a network node over a long-range wireless connection at respective predefined occasions, the predefined occasions being defined by a power save mode (PSM) configuration collectively determined for the group of wireless devices, the wireless device comprising processing circuitry, the processing circuitry being configured to cause the wireless device to:
  receive paging originating from the network node, wherein the paging when received during the predefined occasions for the wireless device is received from the network node, the method further comprises:
  transmit, when the paging is targeted for the wireless device itself, a paging response towards the network node; and
  forward, when the paging is targeted for another one of the wireless devices in the group of wireless devices, the paging to the targeted wireless device over the short-range connection.

23. A wireless device for handling paging from a network node, the wireless device being configured to be part of a group of wireless devices capable of communicating with each other over a short-range connection and capable of communicating with a network node over a long-range wireless connection at respective predefined occasions, the predefined occasions being defined by a power save mode (PSM) configuration collectively determined for the group of wireless devices, the wireless device comprising:
  a receive module configured to receive paging originating from the network node, wherein the paging when received during the predefined occasions for the wireless device is received from the network node;

a transmit module configured to transmit, when the paging is targeted for the wireless device itself, a paging response towards the network node; and a forward module configured to forward, when the paging is targeted for another one of the wireless devices in the group of wireless devices, the paging to the targeted wireless device over the short-range connection.

24. The wireless device according to claim 23, further being configured to perform:

transmitting a paging response towards the network node when the paging is received outside the predefined occasions for the wireless device and targeted for the wireless device itself, is received from another wireless device in the group of wireless devices.

25. A network node for paging a wireless device, the wireless device being part of a group of wireless devices capable of communicating with each other over a short-range connection and capable of communicating with the network node over a long-range wireless connection at respective predefined occasions, the predefined occasions being defined by a power save mode (PSM) configuration collectively determined for the group of wireless devices, the network node comprising processing circuitry, the processing circuitry being configured to cause the network node to:

transmit a paging towards the wireless device, wherein, when the paging is transmitted during the predefined occasions for the wireless device, the paging is transmitted to the wireless device itself, and wherein, when the paging is transmitted outside the predefined occasions for the wireless device, the paging is transmitted to another wireless device in the group of wireless devices and during the predefined occasions for said another wireless device.

26. A network node for paging a wireless device, the wireless device being part of a group of wireless devices capable of communicating with each other over a short-range connection and capable of communicating with the network node over a long-range wireless connection at respective predefined occasions, the predefined occasions being defined by a power save mode (PSM) configuration collectively determined for the group of wireless devices, the network node comprising:

a transmit module configured to transmit a paging towards the wireless device, wherein, when the paging is transmitted during the predefined occasions for the wireless device, the paging is transmitted to the wireless device itself, and wherein, when the paging is transmitted outside the predefined occasions for the wireless device, the paging is transmitted to another wireless device in the group of wireless devices and during the predefined occasions for said another wireless device.

27. The network node according to claim 26, further being configured to perform:

transmitting data towards the wireless device when the data is transmitted during the predefined occasions for the wireless device; and when the data is transmitted outside the predefined occasions for the wireless device, transmitting the data to another wireless device in the group of wireless devices during the predefined occasions for said another wireless device.

28. A non-transitory computer readable storage medium comprising a computer program for handling paging from a network node, the computer program comprising computer code which, when run on processing circuitry of a wireless device, the wireless device being configured to be part of a group of wireless devices capable of communicating with each other over a short-range connection and capable of communicating with a network node over a long-range wireless connection at respective predefined occasions, the predefined occasions being defined by a power save mode (PSM) configuration collectively determined for the group of wireless devices, causes the wireless device to:

receive paging originating from the network node, wherein the paging when received during the predefined occasions for the wireless device is received from the network node, the method further comprises:

transmit, when the paging is targeted for the wireless device itself, a paging response towards the network node; and forward, when the paging is targeted for another one of the wireless devices in the group of wireless devices, the paging to the targeted wireless device over the short-range connection.

29. A non-transitory computer readable storage medium comprising a computer program for paging a wireless device, the wireless device being part of a group of wireless devices capable of communicating with each other over a short-range connection and capable of communicating with the network node over a long-range wireless connection at respective predefined occasions, the predefined occasions being defined by a power save mode (PSM) configuration collectively determined for the group of wireless devices, the computer program comprising computer code which, when run on processing circuitry of a network node, causes the network node to:

transmit a paging towards the wireless device, wherein, when the paging is transmitted during the predefined occasions for the wireless device, the paging is transmitted to the wireless device itself, and wherein, when the paging is transmitted outside the predefined occasions for the wireless device, the paging is transmitted to another wireless device in the group of wireless devices and during the predefined occasions for said another wireless device.

* * * * *